United States Patent [19]

Wiholm

[11] Patent Number: 4,731,150

[45] Date of Patent: Mar. 15, 1988

[54] APPARATUS FOR GLUEING TOGETHER MATERIAL LAYERS

[75] Inventor: Sture Wiholm, Johanneshov, Sweden

[73] Assignee: Bind-O-Matic AB, Stockholm, Sweden

[21] Appl. No.: 902,405

[22] PCT Filed: Jan. 7, 1985

[86] PCT No.: PCT/SE85/00005

§ 371 Date: Aug. 27, 1986

§ 102(e) Date: Aug. 27, 1986

[87] PCT Pub. No.: WO86/04025

PCT Pub. Date: Jul. 17, 1986

[51] Int. Cl.[4] ........................ B32B 31/04; B32B 31/10; B32B 31/12

[52] U.S. Cl. .................................... 156/546; 156/544; 156/545; 156/554; 156/556; 271/236; 271/238; 271/240; 271/245; 493/334

[58] Field of Search ................................ 156/544-546, 156/554, 556, 560, 561; 271/240, 245, 247, 236, 238; 493/334

[56] References Cited

U.S. PATENT DOCUMENTS 3,068,501 12/1962 Mcahon .

3,314,089 4/1967 Margolis et al. .

3,361,426 1/1968 Pawlikowski et al. ............ 271/240

3,694,295 9/1972 Nichols .......................... 156/538 X 4,518,379 5/1985 Eldridge ............................ 493/334

4,533,134 8/1985 Galster ............................... 271/240

*Primary Examiner*—Donald E. Czaja

*Assistant Examiner*—Jeff H. Aftergut

*Attorney, Agent, or Firm*—Dressler, Goldsmith, Shore, Sutker & Milnamow, Ltd.

[57] ABSTRACT

An apparatus for glueing together two different material layers, of which one is intended to form a first cover in a folder, file or the like and the other a second cover and/or a spine in the folder, file or the like, the glueing being carried out in an area where the layers overlap each other, by a glueing device included in the apparatus, said device coating one side of one layer with a glue strip along or close to one edge thereof. The apparatus also includes an aligning means (23, 25), which aligns both layers relative each other so that they overlap each other in an area which is at least as wide as the width of the glue strip, a pressing means (26, 28) pressing both layers towards each other in the area for the glue strip therebetween, and a feed means (6-10, 15-18, 29-32) for feeding the layers through the apparatus.

3 Claims, 2 Drawing Figures

APPARATUS FOR GLUEING TOGETHER MATERIAL LAYERS

DESCRIPTION

1. Technical Field

The present invention relates to an apparatus for glueing together two different material layers, of which one is intended to form a first cover in a folder, file or the like, and the other a second cover and/or a spine in a folder, file or the like, there being on said spine a glue strip for binding sheets inserted in the folder, file or the like which are intended to be fastened to the strip, glueing together taking place in an area where the layers overlap each other.

2. Background Art

It is already known to manufacture folders or files of the kind described above by manually inserting a first sheet in a glueing machine, and after the glueing operation, during which one side of the sheet is coated with a glue bead along an edge thereof, manually to turn the sheet and put it with the glued side upwards on a substructure, whereafter a second sheet is manually placed on the substructure while adjusting it relative the first sheet, so that the sheets are caused to overlap each other in the area of the glue bead. The upper sheet is subsequently pressed against the lower sheet in said area with the fingers of the hand, whereafter the thus glued-together sheets are removed from the substructure.

The glued-together sheets are then placed in a machine, e.g. of the kind illustrated in the U.S. Pat. No. 4,367,061, for providing the part of the first sheet which is to form the spine of the finished file or folder with a hot-melt glue strip and also to provide creasing lines between the spine and the covers. After the covers have been folded along the creasing lines so that they are opposite each other, sheets may be inserted between the covers and be caused to engage against the hot melt strip on the inside of the spine, and the folder or file being placed on a heated substructure in an apparatus, e.g. of the kind illustrated in the U.S Pat No. 4,367,116, so that the hot melt glue strip melts and the edges of the sheets adhere to the inside of the spine.

Particularly the handling of both sheets in conjunction with glueing together thereof, is very time-consuming, since a large part of the handling is manual. Furthermore, the manual handling results in a qualitatively relatively poor product being obtained, since the aligning of the sheets relative each other in the glueing area cannot be done exactly, and since the pressing force in this area varies along the length of the glue strip.

DISCLOSURE OF INVENTION

One object of the present invention is at least partially to eliminate the disadvantages with the previously used glueing processes, and to provide an apparatus which carries out the glueing and the work operations associated therewith automatically and with great accuracy.

This object is achieved by the apparatus in accordance with the invention being given the distinguishing features disclosed in the claims.

PREFERRED EMBODIMENT

Figure 1:
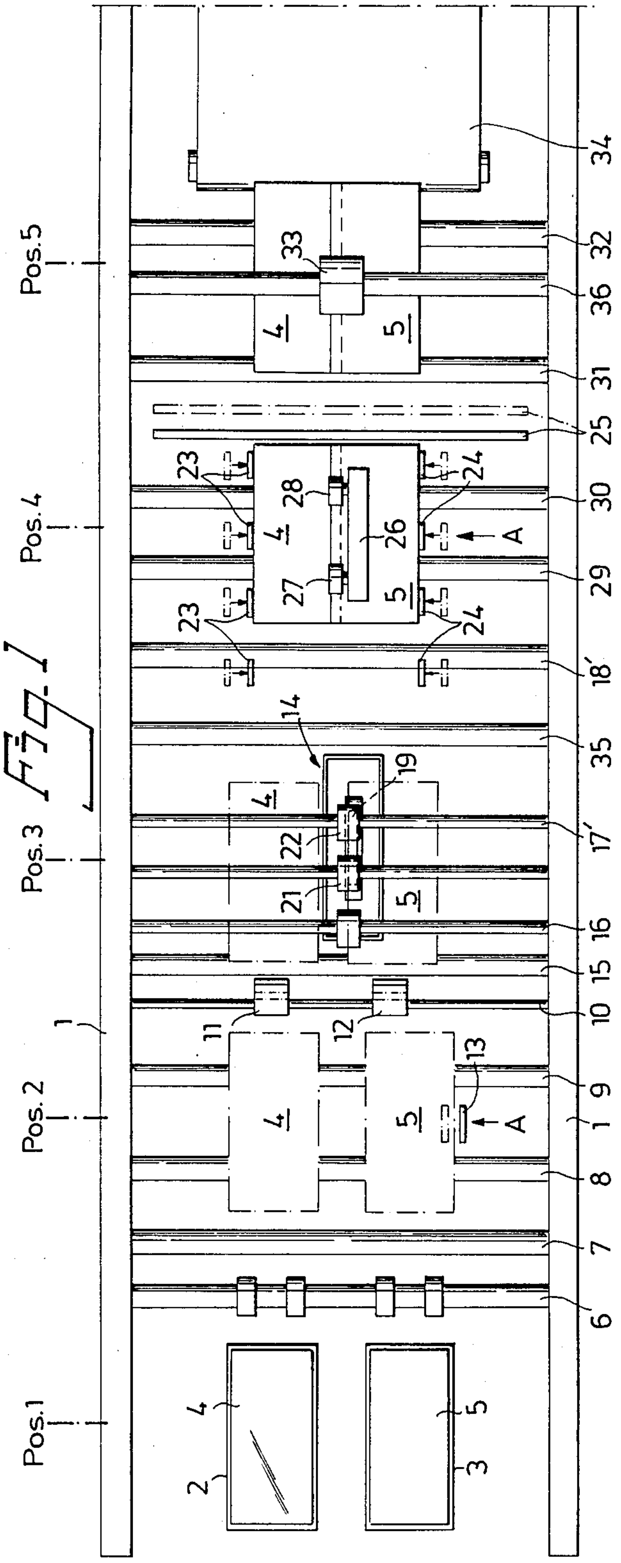
FIG. 1 is a schematic plan of an apparatus in accordance with the invention, seen from above.

The apparatus in accordance with the invention includes a stand 1, upstanding on a floor, and carrying all the parts included in the apparatus. Two magazines 2 and 3 are situated on the input side of the apparatus, one magazine 2 containing a sheaf of plastic sheets and the other magazine 3 a sheaf of paper sheets. The plastic and paper sheets are equally as long in the longitudinal direction of the apparatus, but the paper sheet is somewhat wider than the plastic sheets, since the paper sheet shall not only form a cover in a finished folder or file, but also a spine, which is formed in a later work operation by providing the paper sheet with creasing lines, and folding the sheet along these so that the cover portion thereof will be situated opposite the plastic sheet, which thus forms the second cover which has exactly the same format as the first cover. How the crease lines are formed, how the folder is provided with a glue strip and how the file is finished, is described exhaustively in the above-mentioned U.S. Pat. Nos. 4,367,061 and 4,367,116.

The upper plastic sheet 4 in the magazine 2 and the upper paper sheet 5 in the magazine 3 are lifted by previously known and unillustrated means from the respective sheaves in the position 1 and inserted between a roll pair 6 with rollers, rotatably mounted in the stand 1. The roll pair 6 and other roll pairs included in the apparatus comprise lower drive rolls (not shown) and upper bolster rolls, of which those lacking rollers also allow the movement of the sheets at right angles to the longitudinal direction of the apparatus. The roll pairs 6 and roll pairs 7, 8 and 9 advance the sheets 4 and 5 towards a stop means comprising two abutments 11 and 12 attached to a rotatable shaft 10, while the paper sheet 5 is moved in a direction A by an arm 13 engaging in one long side of the sheet, such as to align it in the correct position relative a glueing means 14 in position 2. The alignment in the direction A is terminated when the sheets strike the abutments 11 and 12, with which both sheets are also aligned in the longitudinal direction so that their forward edges are situated in line with each other.

Figure 2:
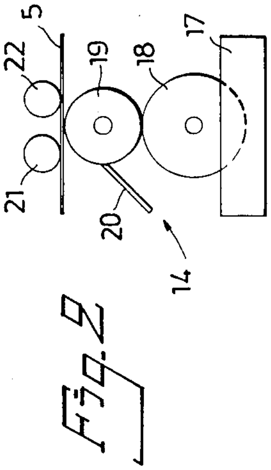
FIG. 2 is a schematic side view of a glueing device included in the apparatus of FIG. 1.

The abutments 11 and 12 are then turned downwards by turning the shaft 10 so that the sheets 4, 5 may be moved by the roll pairs 9, 15, 16 towards the glueing device 14, which comprises a container 17 (see FIG. 2), filled with liquid glue, in which a disc 18 continuously rotates for transferring glue to a glueing wheel 19, driven by the disc 18, glue being scraped off the rotating circumference of the glueing wheel 19 to a suitable thickness by a scraper 20. When the sheet 5 is inserted and moved between the glueing wheel 19 and rollers 21 and 22 (position 3) situated adjacent the glueing wheel, the sheet is pressed against the glueing wheel and provided with a glue strip on one side along a longitudinal edge of the sheet 5. The sheet 4 is simultaneously moved parallel to the sheet 5 at a distance from the glueing means 14.

While the sheets 4, 5 are moved from position 3 to position 4 by the roll pairs 17, 35 and 18 the sheets are also moved towards each other by arms 23, 24, which are movable to and from each other, the sheets thus being put in register so that they overlap each other a distance substantially corresponding to the width of the glue strip on the sheet 5. During the movement towards each other, the sheets 4, 5 are situated at different levels so that there is no contact between them before they are exactly aligned relative each other. The final alignment of the sheets 4, 5 in the direction A is carried out as described above the arms 23, 24 and in the longitudinal direction by a swingable stop bar 25, which takes up the position illustrated by full lines in FIG. 1 for stopping the movement of the sheets in the longitudinal direction of the apparatus for a short time and aligning them before the bar 25 is swung away to the position illustrated by chain dotted lines, where it no longer prevents the continued movement of the sheets.

Immediately after the bar 25 has been swung away and the arms 23, 24 have terminated their movement towards each other, a support plate 26 is moved down towards the sheets 4, 5 there being two rollers 27 and 28 pivotably mounted on the plate 26. The rollers 27, 28 are situated immediately above the overlapping area of the sheets and opposite two bolster rollers (unillustrated) attached to the drive shaft 29 and 30. When the rollers 27, 28 press the sheet 5 down onto the sheet 4 in this area while the sheets are simultaneously advanced in the longitudinal direction of the apparatus, the sheets mutually adhere and are thus united with each other. During continued movement of the sheets in the last-mentioned direction of the drive roll pairs 31, 32 and 36, the sheets are finally pressed together along the whole of the overlapping area by a roller 33 and an unillustrated drive roller placed directly opposite it, before the mutually united sheets are discharged to a conveyor belt 34 for further handling.

Although only one embodiment of the invention has been described above and illustrated on the drawings, it should be understood that the invention is not limited to this embodiment and only by what is disclosed in the claims.

I claim:

1. In an apparatus for glueing together two different material layers (4, 5), of which one is intended to form a first cover in a folder, file or the like, and the other a second cover and/or a spine in the folder, file or the like, wherein said apparatus includes:

glueing means (14) for coating one side of one of said layers with a glue strip along or close to one edge thereof to accommodate the glueing together of said layers (4, 5) in an area where the layers (4, 5) overlap each other:

layer aligning means (23–25) for aligning said layers (4, 5);

press means (26–28) for pressing both layers (4, 5) towards each other in the area of overlap during a pressing operation; and feed means (6–10, 15–18, 29–32) for feeding the layers (4, 5) in a feeding direction parallel to the length of said glue strip along a feed path through the apparatus from an upstream region of the apparatus to a downstream region of the apparatus;

said apparatus characterized in that:

said feed means (6–10, 15–18, 29–32) comprise rolls allowing both layers (4, 5) to be horizontally displaced thereon;

said aligning means (23–25) comprise a first means (25) for engaging the leading end edges of both layers (4, 5) on the rolls in order to align the leading and edges of said layers (4, 5) relative to each other along a line perpendicular to the feeding direction, said first means (25) including a stop member (25) which is disposed in the immediate vicinity of the press means (26–28) and downstream of both said glueing means (14) and said press means (26–28) and against which the layers (4, 5) are moved for engagement before the pressing operation, said stop member (25) being displaceable into and out of said feed path to permit continued feeding of the layers (4, 5) after the pressing operation; and said aligning means (23–25) also comprise a second means (23, 24) downstream of glueing means (14) for displacing both layers (4, 5) on the rolls perpendicular to the feeding direction to overlap the layers (4, 5) in the overlapping area and align the longitudinal edges of said layers (4, 5) relative to a line parallel to the feeding direction which is parallel to the length of said glue strip.

2. Apparatus as claimed in claim 1 further characterized in that said second means (23, 24) are synchronized with said first means (25) for displacing the layers (4, 5) towards each other during movement of the layers (4, 5) toward said first means (25).

3. Apparatus as claimed in claim 1 or 2 further characterized in that said press means (26, 28) includes roller means (27, 28) for rolling against one layer (5) while the layers (4, 5) are moved by said feed means (18, 29–31).

* * * * *